US009960952B2

(12) United States Patent
Venkataraman et al.

(10) Patent No.: US 9,960,952 B2
(45) Date of Patent: May 1, 2018

(54) PROACTIVE FAULT DETECTION AND DIAGNOSTICS FOR NETWORKED NODE TRANSACTION EVENTS (71) Applicant: CA, Inc., New York, NY (US)

(72) Inventors: Seshadri Venkataraman, Union City, CA (US); Venkatesh Seenivasan, Dublin, CA (US)

(73) Assignee: CA, Inc., New York, NY (US)

( * ) Notice: Subject to any disclaimer, the term of this patent is extended or adjusted under 35 U.S.C. 154(b) by 250 days.

(21) Appl. No.: 15/073,543

(22) Filed: Mar. 17, 2016

(65) Prior Publication Data
US 2017/0272306 A1 Sep. 21, 2017

(51) Int. Cl.
G06F 15/173 (2006.01)
H04L 12/24 (2006.01)
H04L 29/08 (2006.01)

(52) U.S. Cl.
CPC .......... H04L 41/065 (2013.01); H04L 41/069 (2013.01); H04L 67/22 (2013.01)

(58) Field of Classification Search
CPC ...... H04L 41/065; H04L 67/22; H04L 41/069
USPC ........................................ 709/223, 201, 205
See application file for complete search history.

(56) References Cited

U.S. PATENT DOCUMENTS

| | | | | |
|---|---|---|---|---|
| 7,813,822 B1 * | 10/2010 | Hoffberg | ............ | G06K 9/00369 381/73.1 |
| 8,291,258 B2 * | 10/2012 | Narayanaswamy | ............ | H04L 63/1408 709/224 |
| 8,316,237 B1 * | 11/2012 | Felsher | ................ | H04L 9/0825 380/282 |
| 8,639,625 B1 * | 1/2014 | Ginter | .................... | G06F 21/10 705/50 |
| 9,141,915 B2 | 9/2015 | Alonso et al. | | |

(Continued)

OTHER PUBLICATIONS

Gates, et al., "Internet of Things", CA Technology Exchange: Disruptive Technologies, http://www.ca.com/us/lpg/ca-technology-exchange/internet-of-things.aspx as visited Feb. 29, 2016, 2013, 8 pages.

Primary Examiner — Michael Y Won
(74) Attorney, Agent, or Firm — Gilliam IP PLLC (57) ABSTRACT Techniques for managing networked node transactions are disclosed. In an embodiment, a fingerprint generator determines multiple classifier digital fingerprints that each comprise a bit sequence associated with a respective result classifier. The fingerprint generator receives transaction event entries that contain message text associated with a transaction between two or more nodes. The fingerprint generator generates a digital fingerprint for each of the transaction event entries. Each of the generated digital fingerprints comprises a bit sequence that is associated with an identity of at least one of the two or more nodes, and generating each of the fingerprints includes, for each bit position in the fingerprint bit sequence, determining whether the message text includes a specified text pattern and setting the bit position value based on the determination of whether the message text includes the specified text pattern. An event classifier groups each digital fingerprint into one or more event classification sets that each correspond to one of the result classifiers based, at least in part, on pattern matching the generated digital fingerprint with the classifier digital fingerprints.

15 Claims, 6 Drawing Sheets (56) References Cited

U.S. PATENT DOCUMENTS

| | | | |
|---|---|---|---|
| 2004/0015728 A1* | 1/2004 | Cole | G02B 5/3083 |
| | | | 726/23 |
| 2007/0150084 A1 | 6/2007 | Grubb et al. | |
| 2009/0287837 A1* | 11/2009 | Felsher | G06F 19/322 |
| | | | 709/229 |
| 2013/0232094 A1 | 9/2013 | Anderson et al. | |
| 2015/0213376 A1 | 7/2015 | Ideses et al. | |
| 2015/0227838 A1 | 8/2015 | Wang et al. | |
| 2015/0269050 A1 | 9/2015 | Filimonov et al. | |
| 2017/0272306 A1* | 9/2017 | Venkataraman | H04L 41/065 |

* cited by examiner

PROACTIVE FAULT DETECTION AND DIAGNOSTICS FOR NETWORKED NODE TRANSACTION EVENTS

BACKGROUND

The disclosure generally relates to the field of fault detection, and more particularly to detecting, classifying, and diagnosing faults based on multi-device or multi-system transaction data.

Closely controlled testing and diagnostics are an integral part of hardware and software product development. Post-development (i.e., runtime) operation environments typically rely on client feedback to identify runtime errors or other problems. Such client feedback channels include network-accessible user feedback repositories in which error-specific information is provided in detailed messages. Client feedback may be effective for identifying device-specific and/or application-specific errors but is limited in terms of accurately identifying and/or diagnosing multi-component, multi-program issues. Furthermore, discrete client feedback information is frequently inadequate in identifying operational states and conditions that cause or otherwise precede potentially damaging results even in the absence of technical errors (e.g., code bug or hardware failure).

In some cases, infrastructure management (IM) systems may be utilized to detect system or program errors and to generate corresponding runtime errors messages. Similar to client feedback channels, however, monitoring agents deployed by IM systems typically provide systems and program operating data relating to discrete devices and subsystems. Conventional IM systems may lack the upper layer processing resources required to accurately assess vast, multi-directional input data that is generated by transactions between systems and/or applications across networks. Sensors or other open-platform network entities may provide real-time input of processed metric data generated from raw operational data captured by the sensors. However, such sensor-processed input data does not account for behavioral/functional changes in remote systems that may affect or be affected by local systems. Such localization of operational diagnostics may be inadequate in accounting for dynamic operational conditions of vast numbers of interconnected and multi-variable devices and systems.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without some of these specific details. In other instances, well-known instruction instances, protocols, structures and techniques have not been shown in detail in order not to obfuscate the description.

Overview

The embodiments disclosed herein describe techniques for managing transactions and operational status of networked nodes, such as nodes in an Internet of Things (IoT) connectivity mesh. In some embodiments, the management of networked nodes encompasses detecting faults at one or more points within a multi-node transaction using a fault classification mechanism that applies a supervised learning method. In some embodiments, the supervised learning method comprises a pattern matching technique, such as a nearest neighbor or k-nearest neighbor (k-NN) method. Consistent with the principles disclosed herein, a fault detection system may include computer hardware, software, and networking components for processing transactions between networked nodes and extracting transaction event information from network messages exchanged or otherwise transmitted in association with the transactions. The inter-system and/or inter-device transactions includes multiple transaction events, such as a query, a response to the query, and a followup query in response to the response. The fault detection system records data for each transaction event (e.g., a status message from a client to a resource server) as a transaction event entry within/by an event log that traps or otherwise intercepts network messages containing transaction event data.

A fault detection system may be configured to analyze the transaction event entries for particular types of data content and for particular patterns within the particular types of data content. In some embodiments, the fault detection system may apply a labeled set of training fingerprints, alternately referred to herein as "classifier digital fingerprints" or "classifier fingerprints," in order to group runtime transaction event entries and/or digital fingerprints generated from the transaction event entries as belonging to one of two or more event classification sets. For example, each of the classifier fingerprints may include or be otherwise associated with "result" classifications such as FAIL, SUCCESS, and NEUTRAL into one of which each of the event classification sets corresponds.

In some embodiments, the classifier and a set of runtime generated fingerprints comprise multiple bit sequences with each bit position corresponding to a text pattern match presence/absence rule. Each of the bit sequences for the runtime generated digital fingerprints is associated with a node identifier of at least one of the two or more nodes associated with the transaction. Each of the bit sequences for the classifier digital fingerprints is associated with a result classifier of at least one of the two or more nodes associated with the transaction. By encoding one and possibly multiple node identifiers with the generated fingerprints, a classifier tool within the fault detection system may generate the event classification sets that may be subsequently processed to combine global event classification factors with node-specific data such as associated with transaction events within fault event sets. The fault event sets may be processed by an alert generator in combination with node profile data to determine one or more existent and/or prospective fault conditions and to further determine a service domain impact scope. The fault event sets may also or otherwise be processed by a regression analyzer to determine one or more causal properties from which other prospective fault conditions may be detected or predicted.

Figure 1:
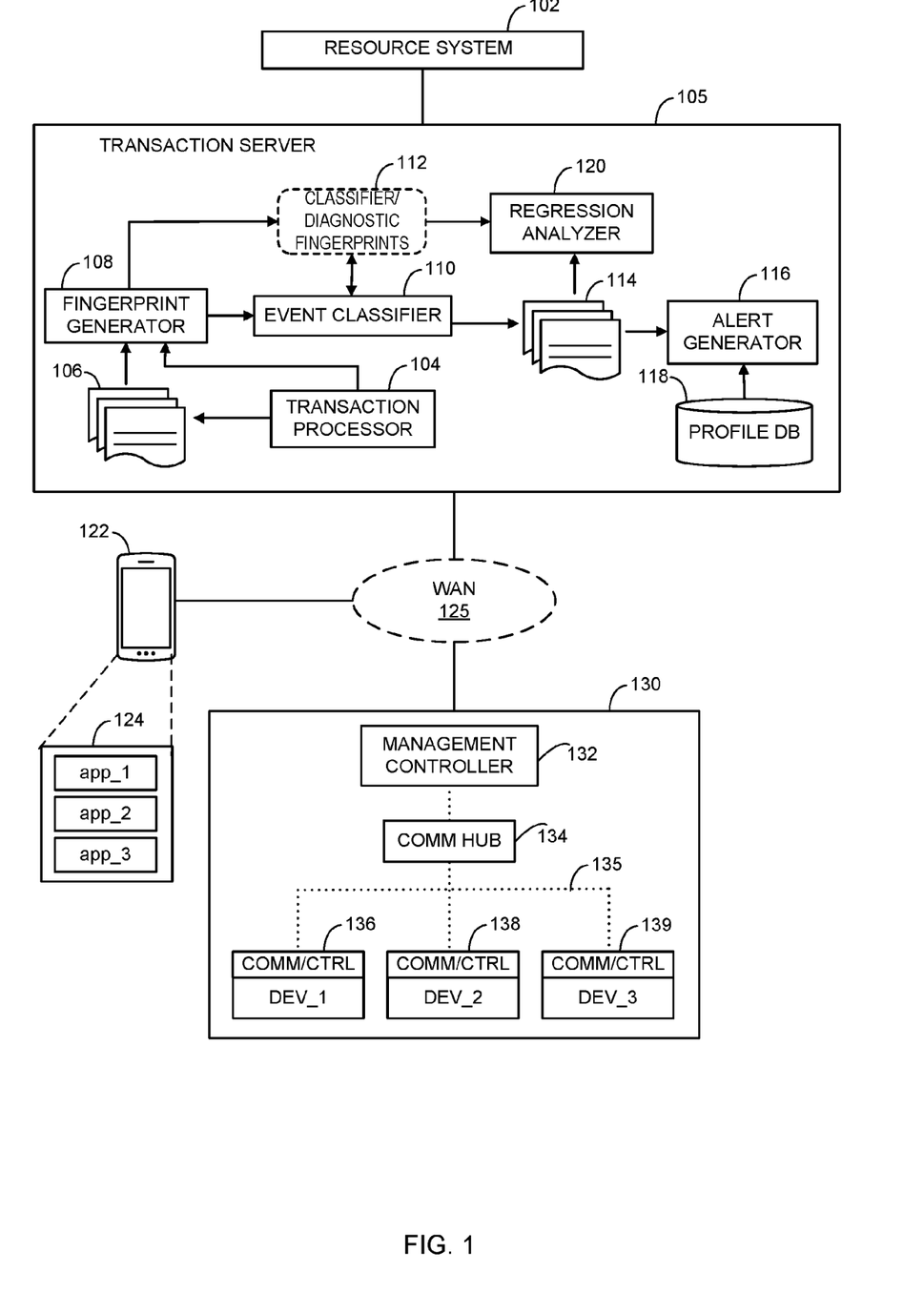
FIG. 1 is a block diagram depicting a network environment including a server configured to condition transaction data to be used for event classification and diagnostics.

FIG. 1 is a block diagram depicting an architectural overview of a networked node environment that includes a server configured to extract and process transaction event data from network messages transmitted as part of transactions between nodes. In the depicted embodiment, a transaction server 105 is connected via a wide area network 125 to multiple networked nodes including a resource system 102, a mobile device 122, and a resource client system 130. In an embodiment, transaction server 105 may be a central server hub that processes transactions among multiple networked nodes. As utilized herein, a networked node, or simply a "node," may be any program or programmed device, component, or system that communicatively interacts with other such nodes capable of intercommunicating using a given communication protocol and/or network protocol layer.

Each of resource system 102, mobile device 122, and resource client system 130 are themselves networked nodes that may participate in inter-node transactions and may contain other nodes such as controller devices, sensors, and application programs that may intercommunicate via the network. For example, mobile device 122 includes client application programs app_1, app_2, and app_3, which include program instructions for communicating with respective server applications within resource system 102 and/or peer applications within resource client system 130. Resource client system 130 includes a management controller 132, which may function as a centralized controller for multiple devices DEV_1 136, DEV_2 138, and DEV_3 139 that are communicatively interconnected via a local area network (LAN) 135. Management controller 132 is connected to a connectivity hub 134, which in some embodiments may be implemented as a router having wireless network capability.

Transaction server 105 receives and coordinates transactions conducted between and among resource system 102, mobile device 122, resource client system 130, and/or the application nodes contained therein. In some embodiments, transaction server 105 is configured to manage transaction messages generated by nodes within a distributed computing environment. Specifically, transaction server 105 includes a transaction processor 104 that is configured, using any combination of coded software, firmware, and/or hardware, to facilitate and ensure completion of transaction processing within distributed computing environment, such as IoT networked devices/applications.

In the depicted embodiment, transaction processor 104 is also configured to include a transaction event log generator that generates and records within logs 106 transaction event entries corresponding to messages sent from, to, or between resource system 102, mobile device 122, and resource client system 130. For example, mobile device 122 may transmit a configuration request message to resource system 102, requesting information about how the devices 136, 138, and/or 139 are currently operationally configured. In response, resource system 102 may transmit a query message to resource client system 130 to obtain the configuration information. In response to the resource system query, resource client system 130 generates and transmits a reply message to resource system 102 that may include the requested information or that indicates a fault in either processing resources or an error incident to responding to the request (i.e., providing the configuration data). Each of the foregoing query and response messages are processed by transaction server 105 which generates transaction event log entries for each. The log entries may include transaction event entries that include a timestamp, the identity of one or more of the associated nodes, and a message text field. For example, the transaction event entry for the response message from resource client system 130 may specify a time of arrival of the message, the identity of resource client system 130 as the message source, the identity of resource system 102 as the destination, and a message text entry that specifies "error" among other text.

In an embodiment, resource system 102, mobile device 122, and resource client system 130 may form a distributed processing and control network in which resource server 102 manages and coordinates activity among the applications and subsystems within mobile device 122 and resource client system 130. For example, resource system 102 may be an energy grid management system, with transaction server 105 receiving and processing messages to, from, and between energy grid clients within mobile device 122 and resource client system 130. In this example, resource client system 130 includes a number of energy consuming and/or energy generating devices DEV_1 136, DEV_2 138, and DEV_3 139 that are communicatively interconnected via LAN 135. Continuing with the example, resource client system 130 may be implemented within a building structure to maximize energy consumption and generation efficiency based on operational cycles of devices 136, 138, and 130. In such an environment, application program app_2 executed from mobile device 122 may include program instructions for sending and receiving energy management messages to and from resource system 102 and resource client system 130. It should be noted that the example of an energy grid distributed computing/networking system is an illustrative example, and that the systems and devices depicted in FIG. 1 may be configured in other practical applications of distributed, networked systems.

Transaction server 105 further includes components for using the message text fields within the transaction event logs 106 to monitor and proactively detect faults and prospective faults associated with the transaction events and corresponding nodes managed by transaction processor 104. As depicted in FIG. 1, these components include a fingerprint generator 108 and an event classifier 110. Fingerprint generator 108 retrieves or otherwise receives transaction event entries from logs 106. Fingerprint generator 108 is further configured, using any combination of coded software, firmware, and/or hardware, to process transaction event data to generate fingerprint records for each of the transaction event entries. Fingerprint generator 108 is configured to generate at least two distinct categories of fingerprints. The first category is embodied as a set of classifier fingerprints 112 that are generated and persistently maintained for the purpose of facilitating groupings of "runtime" fingerprints into event classification sets. The second category is embodied as fingerprints (depicted in FIG. 2) that encode portions of text messages in a sequential bit code that may be pattern matched with the classifier fingerprints. Further details regarding the operations and functions performed by fingerprint generator 108 to generate classifier and other fingerprints are depicted and described with reference to FIGS. 2, 3, and 4.

The generated runtime (i.e., non-classifier) fingerprints are received as input data to event classifier 110, either as a stream or as batched input. Event classifier 110 is configured, using any combination of coded software, firmware, and/or hardware, to directly group the fingerprints (and indirectly the corresponding transaction event entries) as belonging to one of multiple event classification sets. In some embodiments, event classifier 110 includes a machine learning application, such as a pattern matching application, to group each of the received fingerprints into respective ones of the event classification sets based on pattern correlations between the received fingerprints and a selected subset of classifier fingerprints 112. As depicted and described in further detail with reference to FIGS. 2 and 4, in response to receiving the runtime fingerprints and associated transaction event entry information, event classifier 110 selects and obtains subsets of the classifier fingerprints 112 based, at least in part, on the identities of the nodes identified in the transaction event entries. Event classifier 110 then executes a supervised learning algorithm in which bit sequence patterns in each received fingerprint is pattern matched with bit sequence patterns of the selected subset of classifier fingerprints 112. A result classifier is associated with each of the selected subset of classifier fingerprints, and the received fingerprints are assigned an event classification corresponding to the result classifier of the classifier fingerprints to which the received fingerprints most closely match.

Based on the groupings of received fingerprints into a respective one of the event classifications, event classifier 110 generates a set of files 114 containing classified fingerprint records. Each of the records within files 114 associates a bit sequence constituting the fingerprint with the identities of the associated nodes and also with a classification specifier entry. For instance, the system may utilize success, fail, and neutral event classifications. In this case, the classification entry may be a two-bit code indicating whether the transaction event for which the fingerprint was generated is included in the success, fail, or neutral event classification sets. Event classifier 110 may be configured to further group the fingerprints within one or more of the event classification sets into fault event sets. As depicted and described in further detail with reference to FIGS. 2 and 4, the fault event sets are generated based on transaction activity patterns determined from the transaction event entries.

As further depicted in FIG. 1, files 114 that contain event classification records and fault event records are received as input by an alert generator 116 and a regression analyzer 120. Alert generator 116 determines whether one or more of the event classification sets included in files 114 specifies an operational problem. For instance, alert generator 116 may identify an event classification set comprising fingerprint records with a FAIL classification code as requiring further processing. Alert generator 116 is configured, using any combination of coded software, firmware, and/or hardware, to determine an existent or prospective fault condition based on the event classification. Continuing with the example, alert generator 116 may determine that a transaction from which the fingerprints in a FAIL event classification set were generated has or will terminate unsuccessfully. In response to determining the fault condition, alert generator 116 reads profile data records from a profile database 118. Each of the profile records associates the identity of one or more of the nodes identified in the transaction event entries with service domain data. For instance, a profile record may associate the identifier of application app_1 within mobile device 122 with the identifiers of other nodes, and may further associate the operational relations between the app_1 and the other nodes. Alert generator 116 determines a service domain impact scope based on the service domain data and transaction data within the transaction event entries that correspond to the fingerprints grouped in the fault classification set. Alert generator 116 may further issue an alert, such as via a broadcast or point-to-point network message, to one or more of the nodes based on the service domain impact scope as explained in further detail with reference to FIG. 5.

Files 114 may also be received and processed by regression analyzer 120 in combination with diagnostic fingerprints that are selected and retrieved from classifier fingerprints 112. In an embodiment, fingerprint generator 108 generates and stores diagnostic fingerprints among classifier fingerprints 112 from which they may be selectively retrieved by regression analyzer. More specifically, fingerprint generator 108 generates the diagnostic fingerprints by grouping the fingerprint bit sequences of two or more of the fingerprints within an event classification set. Regression analyzer 120 determines a causal property for a given fault event set based on regression processing of the associated fingerprints within the fault event set with respect to the diagnostic digital fingerprint.

Figure 2:
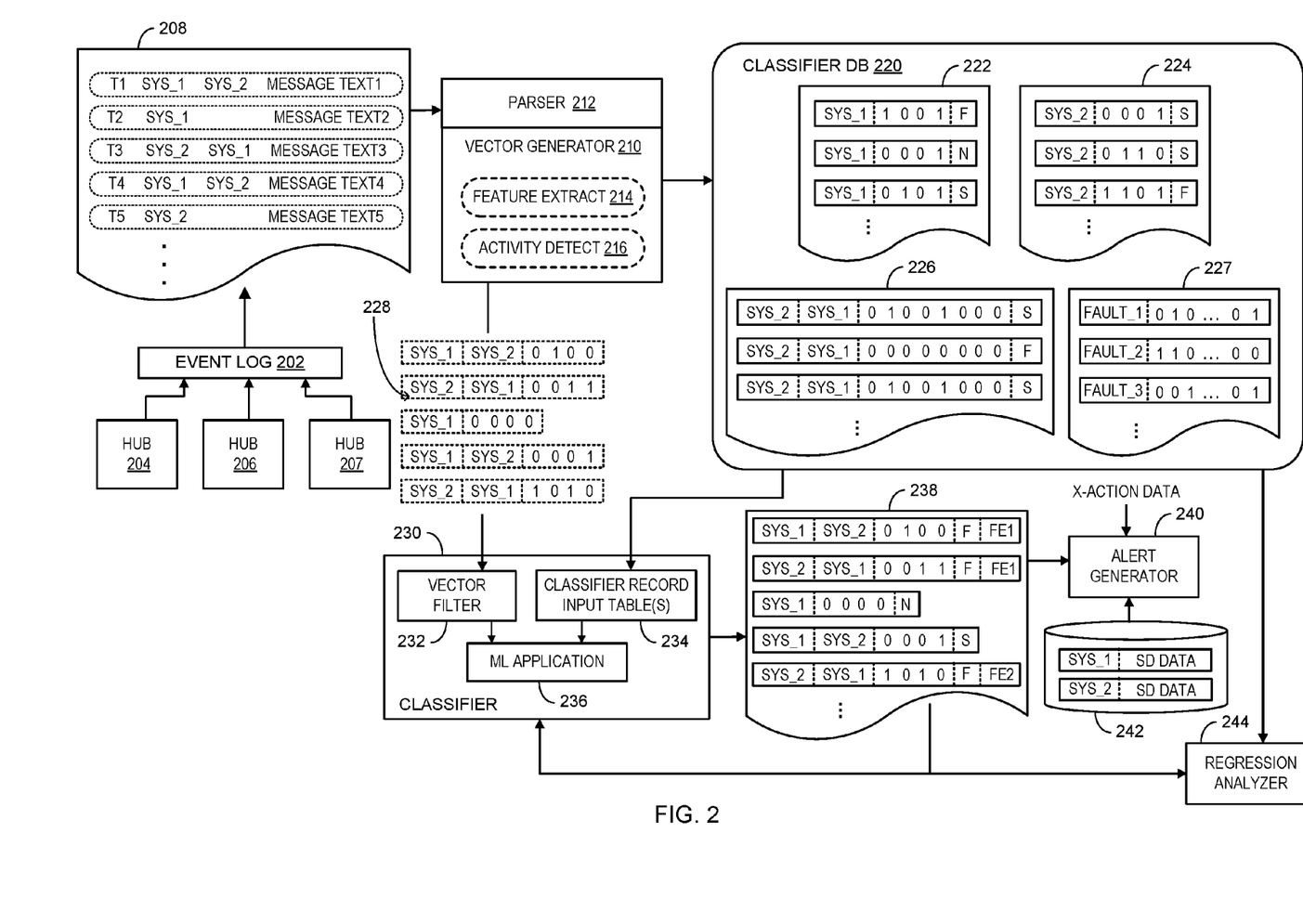
FIG. 2 is a block diagram illustrating subsystems, devices, components, and data structures utilized for fingerprinting and classifying networked node transactions in accordance with some embodiments.

FIG. 2 is a block diagram illustrating a fault detection system comprising subsystems, devices, components, and data structures utilized for fingerprinting and classifying networked node transactions in accordance with some embodiments. The fault detection system includes an event log generator 202 that receives transaction-related network messages from multiple network hubs 204, 206, and 207. Each of hubs 204, 206, and 207 functions as a connection point for multiple networked nodes such as those depicted and described with reference to FIG. 1. The network messages are received and processed by event log generator 202 to generate an event log file 208 that records multiple transaction event entries that each correspond to one of the received messages. As shown, each entry includes multiple associated fields including a timestamp field, one or more node ID fields, and a message text field. For instance, the fourth entry within event log file 208 includes a timestamp entry, T4, two node ID entries, SYS_1 and SYS_2, and a message text entry, MESSAGE TEXT4.

Event log file 208 is received and processed by a parser 212 which, in combination with a vector generator 210, functions as a fingerprint generator. Parser 212 initially receives and parses the message text fields of each of the transaction event entries based on multiple text pattern matching rules. For example, parser 212 parses the MESSAGE TEXT1 entry that comprises a string or sequence of natural language words or variations of such words, such as "granted," "denied," "pending," "ack," "authen," etc. In an embodiment, each of the text pattern matching rules implemented by parser 212 specifies a text pattern, such as a particular word, for which the presence or absence of which is determined by parser 212.

For each transaction event entry, parser 212 signals vector generator 210 to generate a new fingerprint record. Parser 212 identifies the node ID entries and transmits the node IDs to the vector generator 210 which enters the node ID entries into node ID fields in the new fingerprint record. Parser 212 executes each of the pattern matching rules sequentially or in parallel and sends the results to vector generator 210, which responds by either asserting or de-asserting a bit value, such as a single bit flag, based on the result of each of the pattern matching rules. For example, parser 212 may execute four text pattern rules, each of which determine the presence or absence of four different words or other sequential text patterns (e.g., a sets of words, abbreviations, etc.). Vector generator 210 responds by asserting or de-asserting each of four bit positions within a bit sequence that when complete constitutes a digital fingerprint for the transaction event entry from which it was generated.

As explained with reference to FIG. 1, a fingerprint generator such as constituted by parser 212 and vector generator 210 may generate two categories of fingerprints and fingerprint records. The fingerprint generator depicted in FIG. 2 generates fingerprints and corresponding fingerprint records that are stored as tables or files in a classifier database 220. During a fault detection system training interval, the fingerprint generator receives and processes transaction event entries to generate sets of classifier digital fingerprints that are associated within respective records with node IDs and a result classifier indictor. In addition, vector generator 210 includes a feature extractor 214 for controlling the scope of which pattern matching rule results will be incorporated into the classifier fingerprints. For example, during a training interval parser 212 may apply an expanded set of text pattern matching rules in an exploratory manner. Vector generator 210 may iterate through a number of results (e.g., a number of parsed transaction event entries) before feature extractor 214 determines which rules results to incorporate into the classifier fingerprints. Consider a training interval configuration in which parser 212 applies six text pattern matching rules to detect the presence or absence of six different text patterns. Feature extractor 214 detects and applies frequency of occurrences (e.g., percentage of message text entries containing a particular match) in addition to other criteria to exclude two of the pattern matching rules results from the classifier fingerprints. As a result, the classifier fingerprints specified in classifier fingerprint records within classifier database 220 will include a four-bit bit sequence with each bit position corresponding to one of the selected (i.e., non-extracted) rules.

Feature extractor 214 may receive input from an activity detector 216 to provide the additional criteria used in extracting or otherwise de-selecting one or more of the pattern matching rules. For example, activity detector 216 may receive portions of the parsed message text to detect occurrences of other (i.e., not specified by a pattern matching rule), associated text patterns that are recurrently present in message text entries containing the rule-targeted text patterns. Activity detector 216 is further configured to assign a result classifier to each of the classifier fingerprints generated during a training interval. In the depicted embodiment, activity detector 216 assigns one of three result classifiers—success "S", fail "F", and neutral "N" to each classifier bit sequence based either on pre-specified or dynamically determined rules that correlate particular fingerprint bit sequences with one of the three classifications. The training interval processing of multiple transaction event entries results in generation and storage of corresponding classifier fingerprint records within files 222 and 224. As shown, classifier fingerprint records associated with node ID SYS_1 are stored in file 222 and classifier fingerprint records associated with node ID SYS_2 are stored in file 224.

During runtime processing of the fault detection system, vector generator 210 generates a series of fingerprint records 228 to be processed by an event classifier 230. Each of the fingerprint records includes one or two node ID field entries and a four bit digital fingerprint. Event classifier 230 includes a vector filter 232 that discards one or more of the fingerprint records that may contain redundancies based on node ID and recurrent fingerprint bit patterns. The remaining of fingerprint records 228 are received as input by a machine learning application 236. In an embodiment, machine learning application 236 may comprise program instructions for implementing a pattern matching algorithm, such as a nearest neighbor or k-nearest neighbor algorithm. Based at least in part on node ID information encoded within fingerprint records 208, machine learning application 236 selects a subset of the classifier fingerprints contained in either or both of files 222 and 224. As depicted and explained in further detail with reference to FIG. 4, machine learning application 236 may use other criteria such as whether the transaction event for which a given fingerprint was generated was a response to a previous transaction event. For instance, in response to determining that a given transaction event is a response to a previous transaction event, machine learning application 236 may select one or more of the records within file 226 which includes classifier fingerprints that have been concatenated with other classifier fingerprints.

Having selected the classifier fingerprints from database 220, event classifier 230 stages the selected classifier fingerprints as input records 234 that are each labeled with their respective result classifiers S, F, or N. Event classifier 230 then executes the machine learning application 236 to match each of the input digital fingerprints with the set of input classifier fingerprints 234 to generate event classification records within an output file 238. As depicted, each of the records within output file 238 associates the fingerprint bit sequence generated by vector generator 210 with one of the result classifiers, S, F, or N, based on the pattern matching. By virtue of common results classifications, each of the fingerprints is grouped into a classification event set (e.g., all fingerprints associated with F belong to the fail event classification set). As explained in further detail with reference to FIG. 4, event classifier 230 may apply further categorize or group one or more of the fingerprint records within file 328 into one or more fault event sets based on processing the message text in a sequence of associated transaction events. Event classifier 230, possibly in coordination with the fingerprint generator, may effectuate the fault event set groupings by setting one or more fault event field bits, such as for the FE1 and FE2 fields within the depicted fingerprint records.

The records within output file 238 are received and processed by an alert generator 240 in combination with transaction data for the corresponding transaction events to determine whether an alert should be issued to one or more of the associated nodes. To this end, alert generator 240 accesses profile records corresponding to the associated nodes (SYS_1 and SYS_2 in the depicted example) that contain service domain information for the nodes. The service domain information may specify, for example, a geographic or other zone (referred to alternately as a service domain) of impact that may be utilized by alert generator in determine whether and where (to what nodes) to issue one or more alerts. The records in output file 238 may also be processed by a regression analyzer 244 in combination with diagnostic fingerprint records contained in a file 227 within classifier database 220 to determine a causal property and one or more prospective fault conditions that may result.

Figure 3:
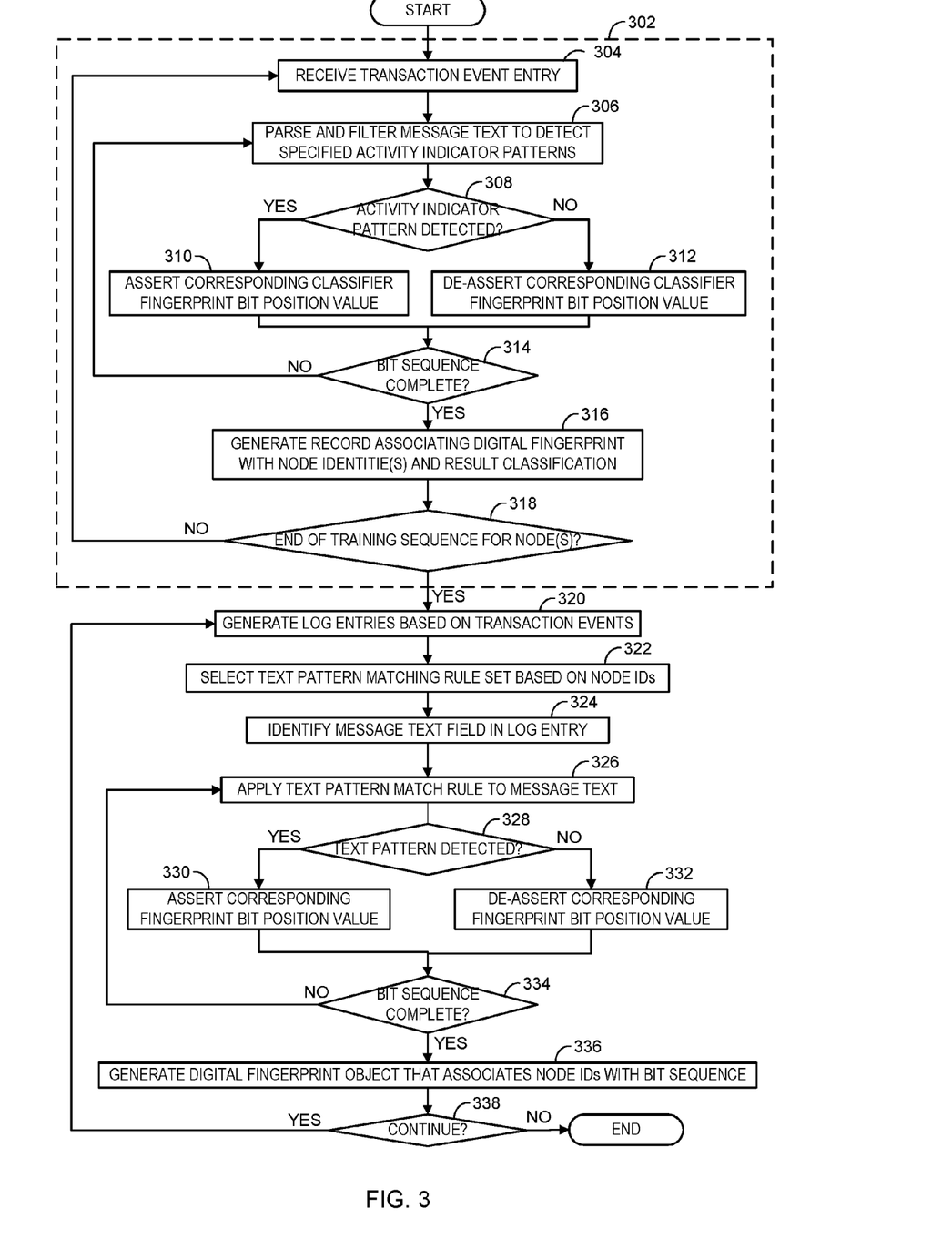
FIG. 3 is a flow diagram depicting operations and functions performed by a fault detection system for mapping transaction data into digital fingerprints in accordance with some embodiments.

FIG. 3 is a flow diagram depicting operations and functions performed by a fault detection system for mapping transaction data into digital fingerprints in accordance with some embodiments. The operations and functions depicted in FIG. 3 may be performed by the components including the nodes, event logs, and fingerprint generators depicted and described with reference to FIGS. 1 and 2. The process begins as shown at superblock 302 with a fingerprint generator performing a training interval in which classifier fingerprints are generated. The training interval begins as shown at block 304 with the fingerprint generator receiving a next transaction event entry such as may be retrieved or otherwise obtained from an event log. The fingerprint generator parses and filters message text within the transaction event entry to detect text patterns based on pre-specified text pattern matching rules and/or based on dynamically determined activity indicator patterns (block 306). In response to detecting the pre-specified or activity-based text pattern, the fingerprint generator asserts a corresponding classifier fingerprint bit position value (blocks 308 and 310). If the text pattern is not detected, control passes from block 308 to block 312 with the fingerprint generator de-asserting the corresponding classifier fingerprint bit position value. It should be noted that "asserted" and "de-asserted" only convey a binary selection and that in an equivalent embodiment, the fingerprint generator may de-assert a bit position in response to detecting a pattern match and assert the bit position in response to not detecting the pattern match.

Classifier fingerprint generation continues at block 314 with a determination of whether or not all text pattern matching rules have been applied by the fingerprint generator to complete the fingerprint bit sequence. If not, control passes back to block 306 and the fingerprint generator applies the next pattern matching rule. Once all pattern matching rules have been applied and the classifier fingerprint is complete for the transaction event entry, the fingerprint generator generates a classifier fingerprint record that contains fields that associate the fingerprint bit sequence with the identities of one or more associated nodes and also with a result classifier (block 316). The training interval continues with control passing from block 318 to block 304 until the training interval sequence is complete.

After classifier fingerprints and corresponding classifier fingerprint records have been generated, the fault detection system may begin runtime fault detection processing in which fingerprints are generated to detect faults and prospective faults. As shown at block 320, runtime processing begins with an event log generator detecting transaction events associated with two or more nodes and generating corresponding transaction event entries. The fingerprint generator reads the transaction event entries and selects a set of text pattern matching rules based, at least in part, on the identities of the nodes identified in the transaction event entry (block 322). Having selected the pattern matching rules, the fingerprint generator identifies and applies the rules to a message text field (blocks 324 and 326). In response to detecting a pattern match for a given rule, the fingerprint generator asserts a corresponding bit position value within the fingerprint bit sequence (blocks 328 and 330). In response to not detecting the pattern match specified by the rule, the fingerprint generator de-asserts the corresponding bit position value within the fingerprint bit sequence (blocks 328 and 332). The fingerprint generator continues applying the rules (control passing from block 334 to back to block 326) in the selected text pattern matching rule set until the fingerprint bit sequence is complete. Control then passes to block 336 with the fingerprint generator generating a fingerprint object, such as a fingerprint record, that associates the determined bit sequence with identifiers of one or more nodes that were identified in the transaction event entry from which the fingerprint was generated. The process of generating digital fingerprints for additional transaction event entries may continue with control passing from block 338 back to block 320.

Figure 4:
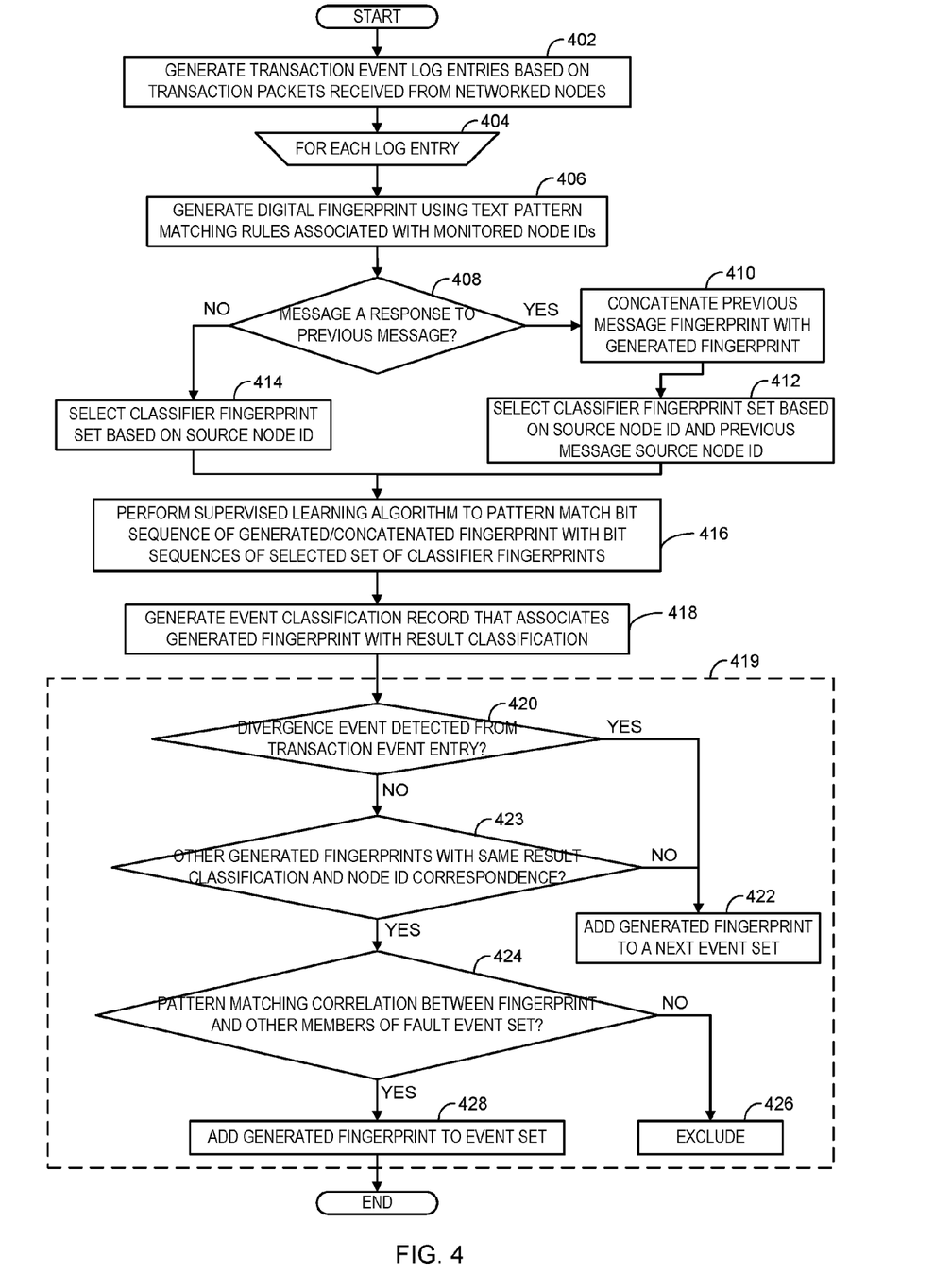
FIG. 4 is a flow diagram illustrating operations and functions performed by a fault detection system for classifying and diagnosing fault conditions in accordance with some embodiments.

FIG. 4 is a flow diagram illustrating operations and functions performed by a fault detection system for classifying transaction events and sequences of transaction events in accordance with some embodiments. The operations and functions depicted in FIG. 3 may be performed by the components including the nodes, event logs, fingerprint generators, and event classifiers depicted and described with reference to FIGS. 1, 2, and 3. The process begins as shown at block 402 with a transaction processor generating transaction event log entries based on network messages generated by multiple networked nodes. Beginning as shown at block 404, processing of each of the generated transaction event entries begins with a fingerprint generator generating a digital fingerprint using multiple text pattern matching rules that are selected based on the identities of the associated nodes (block 406). For example, the fingerprint generator may read the identifier of one or more nodes from the transaction event entry and used the identifier as an index to select a corresponding set of text pattern matching rules. As part of both the fingerprinting and classification process, the fingerprint generator and/or an event classifier may determine whether the transaction event is a response to a previously processed transaction event (block 408). For instance, the fingerprint generator may identify, based on portions of the message text within an event entry, the transaction event as a response, and may further determine a correlation between the source node ID and destination node ID specified by the event entry and a previous event entry. Based on the identification as a response and the source and destination node ID correlation, the fingerprint generator may append a response flag (not depicted) in the fingerprint records.

In response to determining that the transaction event is a response to a previously processed transaction event, the event classifier concatenates the fingerprint generated at block 406 with the fingerprint generated at block 406 for the previous transaction event (block 410). The event classifier also selects a corresponding set of concatenated classifier fingerprints based, at least in part, on the identifier of the node that sourced the response and the identifier of the node to which the response was directed (block 412). If the currently processed transaction event is determined not to be a response, or if the fault detection system is not configured to perform blocks 410 and 412, control passes to block 414 with the event classifier selecting a classifier fingerprint based, at least in part, on the source node identifier specified in the transaction event entry. Following selection of a set of classifier fingerprints, the event classifier executes a machine learning algorithm, such as a supervised learning algorithm in which the fingerprint generated at block 406 and possibly concatenated at block 410 is pattern matched with respect to the selected classifier fingerprints (block 416). The pattern matching at block 416 results in the generated digital fingerprint being associated with a particular result classifier associated with the classifier fingerprints to which the generated fingerprint is found to most closely match. At block 418, the event classifier generates an event classification record that associates the generated fingerprint with the result classifier. The event classification record becomes part of an event classification set of such records based on a shared result classifier.

Having grouped the digital fingerprint (and hence the corresponding transaction event) into an event classification set, the process continues at superblock 419 with a sequence of steps to determine whether or not to further group the digital fingerprint into a fault event set. The fingerprint may be added to an existing or new fault event set by adding an additional fault event classifier field entry to the corresponding fingerprint record. The sequence begins at block 420 with the event classifier determining, based on message text contained in the transaction event entry (i.e., the entry for which the fingerprint was generated at block 406), whether the transaction event entry specifies or otherwise indicates that a series of transactions has reached a divergence point. In response to detecting that the transaction event comprises a divergence event, the event classifier groups the digital fingerprint into a new fault event set by inserting a single or multi-bit fault event classifier code into the fingerprint record (block 422). If the transaction event is determined not be a divergence event, control passes to block 423 with the event classifier further determining, based on previously generated fingerprint records, whether other generated fingerprints have the same event classification indicator and also the same node identifier(s).

In response to not determining a matching correlation in both the event classification indictor and node identifier(s), the event classifier groups the digital fingerprint into a new fault event set (block 422). In response to determining a matching correlation in both the event classification indictor and node identifier(s), the event classifier further determines whether a bit sequence pattern matching correlation exists between the generated fingerprint and the fingerprints of other members of an existing fault event set (block 424). In response to determining a sufficient pattern matching correlation between the generated fingerprint and the fingerprints within the fault event set, the event classifier adds the fingerprint from the fault event set such as by inserting a fault event classifier entry into the fingerprint record (block 428). In response to determining no pattern matching correlation or an insufficient correlation between the generated fingerprint and the fingerprints within the fault event set, the event classifier excludes the fingerprint from the fault event set (block 426).

Figure 5:
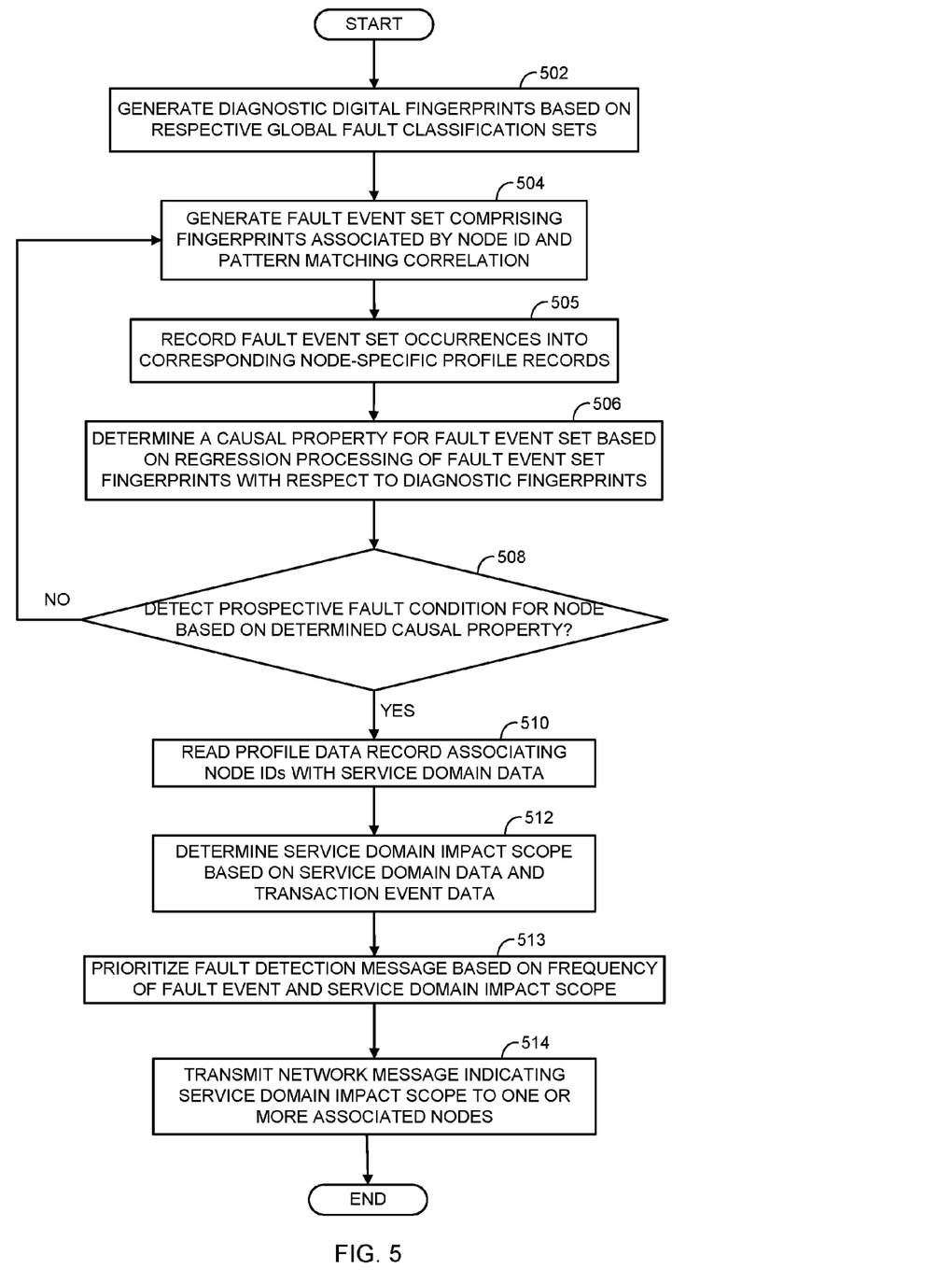
FIG. 5 is a flow diagram depicting operations and functions performed by a fault detection system for determining a service domain impact scope in accordance with some embodiments.

FIG. 5 is a flow diagram depicting operations and functions performed by a fault detection system for determining a service domain impact scope in accordance with some embodiments. The operations and functions depicted in FIG. 5 may be performed by the components including the nodes, event logs, fingerprint generators, event classifiers, regression analyzers, and alert generators depicted and described with reference to FIGS. 1-4. The process begins as shown at block 502 with a fingerprint generator generating diagnostic fingerprints based on multiple fault event classification sets generated during runtime operations. At block 504, an event classifier generates a fault event set comprised of fingerprint records associated by the node identifiers and pattern matching correlations among the fingerprints. Example, operations and function for generating the fault event set are depicted and described with reference to blocks 418, 420, 422, 423, 424, 426, and 428 of FIG. 4.

The alert generator may then record each of the records within the fault event set into corresponding node profile records (block 505). For example, the alert generator may record an entry/record within a given fault event set into a profile record that specifies the same node ID as the fault event record. In this manner, a profile record that specifies a given node ID may accumulate number of such fault event records.

Next at block 506 a regression analyzer determines a causal property for the generated fault event set based, at least in part, on regression processing of the fingerprints within the fault event set with respect to the diagnostic fingerprints. Control passes to block 508 with an alert generator detecting or failing to detect a prospective fault condition for an associated node based on the determined causal property. If the alert generator does not detect a prospective fault condition, control returns to block 504 with generation and subsequent processing of another fault event sent. In response to detecting a prospective fault condition, the alert generator reads a profile data record that associates an identifier of the source node with service domain data (block 510). Next at block 512, the alert generator determines a service domain impact scope based on the service domain data and on transaction data included in one or more of the transaction event entries from which the fault event set fingerprints were generated. The alert generator may then prioritize the existent or prospective fault condition based on the frequency with which a corresponding transaction event has occurred (block 513). For example, the alert generator may determine the frequency of fault-event-associated transaction event occurrence based on the accumulated number of matching or otherwise correlated fault event records that are included in the profile record of a given node. The processed concludes as shown at block 514 with the alert generator transmitting, either broadcast or point-to-point, a network message indicating the service domain impact scope to the associated nodes.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality provided as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
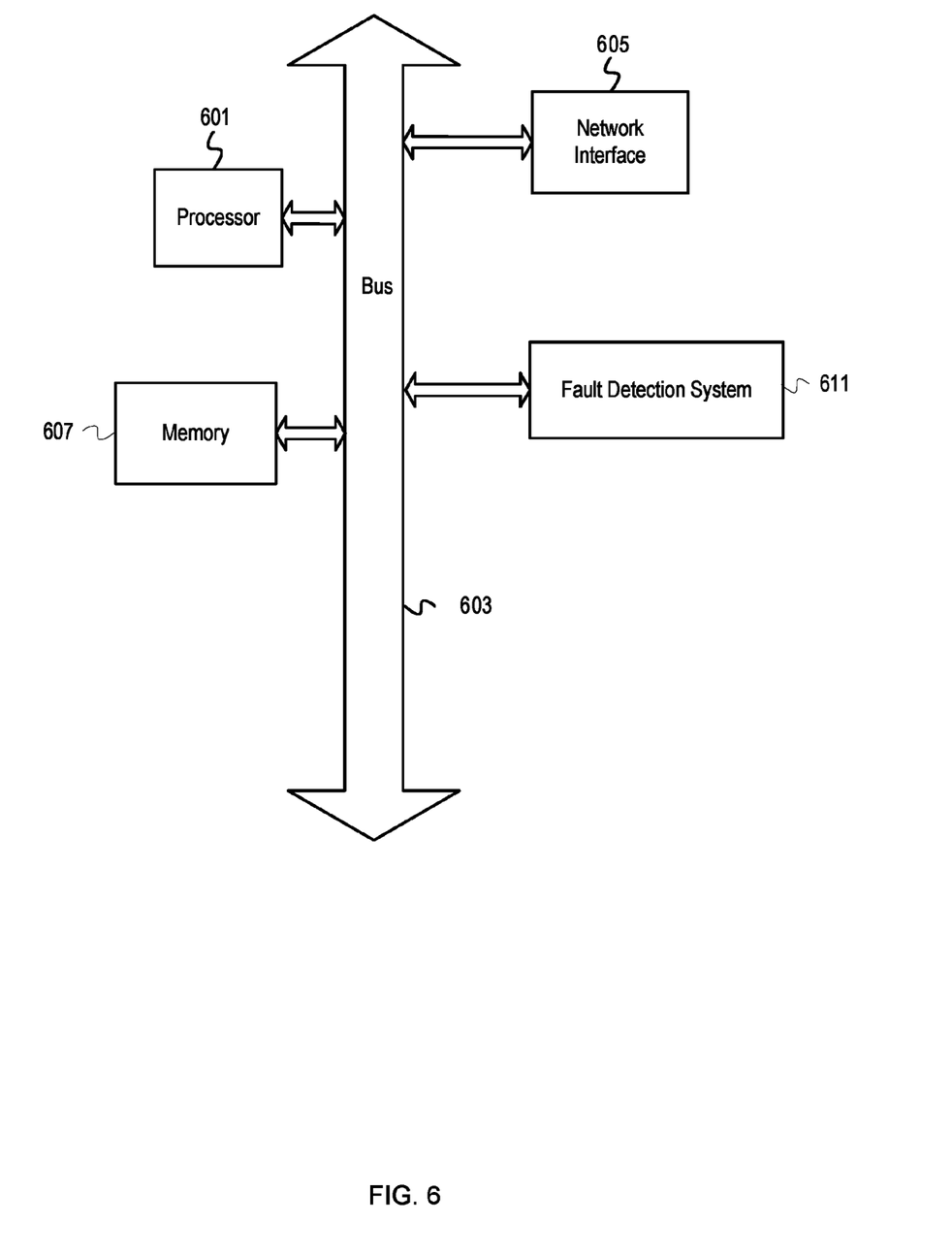
FIG. 6 is a block diagram depicting an example computer system that includes a networked node fault detection system in accordance with some embodiments.

FIG. 6 depicts an example computer system that implements fault detection and diagnostics in accordance with an embodiment. The computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport® bus, InfiniBand® bus, NuBus, etc.) and a network interface 605 (e.g., a Fiber Channel interface, an Ethernet interface, an internet small computer system interface, SONET interface, wireless interface, etc.). The system also includes a fault detection system 611. Any one of the previously described functionalities may be partially (or entirely) implemented in hardware and/or on the processor unit 601. For example, the functionality may be implemented with an application specific integrated circuit, in logic implemented in the processor unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601 and the network interface 605 are coupled to the bus 603. Although illustrated as being coupled to the bus 603, the memory 607 may be coupled to the processor unit 601.

While the aspects of the disclosure are described with reference to various implementations and exploitations, it will be understood that these aspects are illustrative and that the scope of the claims is not limited to them. In general, techniques for an object storage backed file system that efficiently manipulates namespace as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality shown as separate components in the example configurations may be implemented as a combined structure or component. Similarly, structures and functionality shown as a single component may be implemented as separate components. These and other variations, modifications, additions, and improvements may fall within the scope of the disclosure.

What is claimed is:

1. A method for managing networked node transactions, said method comprising:

generating, by a fingerprint generator, multiple classifier digital fingerprints, wherein each of the classifier digital fingerprints comprises a bit sequence, recorded in association with a respective result classifier;

generating, by a transaction processor, transaction event entries from network messages between nodes, wherein the transaction event entries contain message text associated with a transaction between two or more nodes;

generating, by the fingerprint generator, a digital fingerprint, from each of the transaction event entries, wherein each of the generated digital fingerprints comprises a bit sequence that is associated with an identity of at least one of the two or more nodes, and wherein said generating a digital fingerprint includes, for each bit position in the bit sequence, determining whether the message text includes a specified text pattern; and setting the bit position value based on the determination of whether the message text includes the specified text pattern; and for each of the generated digital fingerprints, grouping the generated digital fingerprint into one or more event classification sets that each correspond to one of the result classifiers based, at least in part, on pattern matching the generated digital fingerprint with the classifier digital fingerprints, wherein the one or more event classification sets includes a fault classification set;

determining a prospective fault condition for one of the two or more nodes based on the fault classification set;

in response to determining the fault condition, reading a profile data record that associates the identity of one of the two or more nodes with service domain data;

determining a service domain impact scope based on, the service domain data and transaction data contained in transaction event entries corresponding to the digital fingerprints grouped in the fault classification set; and issuing an alert to at least one of the two or more nodes based, at least in part, on the service domain impact scope.

2. The method of claim 1, wherein the bit sequence of each of the generated digital fingerprints includes n bits, said generating a digital fingerprint for each of the transaction event entries comprising:

applying each of n text pattern identification rules to message text contained in an transaction event entry to determine, for each of the text pattern identification rules, whether the message text includes a respective one of n specified text patterns; and individually setting each of the n bits based on the determination of whether the message text includes the respective one of the n specified text patterns.

3. The method of claim 1, wherein said grouping the generated digital fingerprints into one or more event classification sets comprises:

associating two or more of the generated digital fingerprints within a fault event set in response, at least in part, to, determining a correspondence among the two or more generated digital fingerprints based, at least in part, on the identities of the two or more nodes; and for each of the two or more generated digital fingerprints, determining a pattern matching correlation between the generated digital fingerprint and the classifier digital fingerprints; and determining a pattern matching correlation between the generated digital fingerprint and the other of the at least two generated digital fingerprints.

4. The method of claim 3, wherein the two or more generated digital fingerprints are generated from transaction event entries that include serial transaction data associated with the two or more nodes, said associating the two or more digital fingerprints into a fault event set further comprising:

comparatively processing a series of the transaction event entries to determine an activity divergence event; and in response to detecting an activity divergence event associated with a next transaction event entry, excluding a digital fingerprint generated for the next transaction event entry from the fault event set.

5. The method of claim 4, further comprising:

generating diagnostic digital fingerprints for each the one or more event classification sets; and determining a causal property for the fault event set based on regression processing of the associated digital fingerprints with respect to the diagnostic digital fingerprints.

6. One or more non-transitory more machine-readable media having program code for managing networked node transactions stored therein, the program code to:

generate, by a fingerprint generator, multiple classifier digital fingerprints, wherein each of the classifier digital fingerprints comprises a bit sequence, recorded in association with a respective result classifier;

generate, by a transaction processor, transaction event entries from network messages between nodes, wherein the transaction event entries contain message text associated with a transaction between two or more nodes;

generate, by the fingerprint generator, a digital fingerprint, from each of the transaction event entries, wherein each of the generated digital fingerprints comprises a bit sequence that is associated with an identity of at least one of the two or more nodes, and wherein said generating a digital fingerprint includes, for each bit position in the bit sequence, determine whether the message text includes a specified text pattern; and set the bit position value based on the determination of whether the message text includes the specified text pattern; and for each of the generated digital fingerprints, group the generated digital fingerprint into one or more event classification sets that each correspond to one of the result classifiers based, at least in part, on pattern matching the generated digital fingerprint with the classifier digital fingerprints, wherein the one or more event classification sets includes a fault classification set;

determine a prospective fault condition for one of the two or more nodes based on the fault classification set;

in response to determining the fault condition, reading a profile data record that associates the identity of one of the two of more nodes with service domain data;

determine a service domain impact scope based on, the service domain data and transaction data contained in transaction event entries corresponding to the digital fingerprints grouped in the fault classification set; and issue an alert to at least one of the two or more nodes based, at least in part, on the service domain impact scope.

7. The machine-readable media of claim 6, wherein the bit sequence of each of the generated digital fingerprints includes n bits, and wherein the program code to generate a digital fingerprint for each of the transaction event entries comprises program code to:

apply each of n text pattern identification rules to message text contained in an transaction event entry to determine, for each of the text pattern identification rules, whether the message text includes a respective one of n specified text patterns; and individually set each of the n bits based on the determination of whether the message text includes the respective one of the n specified text patterns.

8. The machine-readable media of claim 6, wherein the program code to group the generated digital fingerprints into one or more event classification sets comprises program code to:

associate two or more of the generated digital fingerprints within a fault event set in response, at least in part, to, determining a correspondence among the two or more generated digital fingerprints based, at least in part, on the identities of the two or more nodes; and for each of the two or more generated digital fingerprints, determining a pattern matching correlation between the generated digital fingerprint and the classifier digital fingerprints; and determining a pattern matching correlation between the generated digital fingerprint and the other of the at least two generated digital fingerprints.

9. The machine-readable media of claim 8, wherein the two or more generated digital fingerprints are generated from transaction event entries that include serial transaction data associated with the two or more nodes, said program code to associate the two or more digital fingerprints into a fault event set further comprising program code to:

comparatively process a series of the transaction event entries to determine an activity divergence event; and in response to detecting an activity divergence event associated with a next transaction event entry, exclude a digital fingerprint generated for the next transaction event entry from the fault event set.

10. The machine-readable media of claim 9, further comprising program code to:
generate diagnostic digital fingerprints for each the one or more event classification sets; and
determine a causal property for the fault event set based on regression processing of the associated digital fingerprints with respect to the diagnostic digital fingerprints.

11. An apparatus comprising:
a processor; and
a machine-readable medium having program code executable by the processor to cause the apparatus to:
generate, by a fingerprint generator, multiple classifier digital fingerprints, wherein each of the classifier digital fingerprints comprises a bit sequence, recorded in association with a respective result classifier;
generate, by a transaction processor, transaction event entries from network messages between nodes, wherein the transaction event entries contain message text associated with a transaction between two or more nodes;
generate, by the fingerprint generator, a digital fingerprint, from each of the transaction event entries, wherein each of the generated digital fingerprints comprises a bit sequence that is associated with an identity of at least one of the two or more nodes, and wherein said generating a digital fingerprint includes, for each bit position in the bit sequence, determine whether the message text includes a specified text pattern; and
set the bit position value based on the determination of whether the message text includes the specified text pattern; and
for each of the generated digital fingerprints, group the generated digital fingerprint into one or more event classification sets that each correspond to one of the result classifiers based, at least in part, on pattern matching the generated digital fingerprint with the classifier digital fingerprints, wherein the one or more event classification sets includes a fault classification set;
determine a prospective fault condition for one of the two or more nodes based on the fault classification set;
in response to determining the fault condition, reading a profile data record that associates the identity of one of the two of more nodes with service domain data;
determine a service domain impact scope based on, the service domain data and transaction data contained in transaction event entries corresponding to the digital fingerprints grouped in the fault classification set; and
issue an alert to at least one of the two or more nodes based, at least in part, on the service domain impact scope.

12. The apparatus of claim 11, wherein the bit sequence of each of the generated digital fingerprints includes n bits, and wherein the program code comprises program code executable by the processor to cause the apparatus to:
apply each of n text pattern identification rules to message text contained in an transaction event entry to determine, for each of the text pattern identification rules, whether the message text includes a respective one of n specified text patterns; and
individually set each of the n bits based on the determination of whether the message text includes the respective one of the n specified text patterns.

13. The apparatus of claim 11, wherein the program code comprises program code executable by the processor to cause the apparatus to:
associate two or more of the generated digital fingerprints within a fault event set in response, at least in part, to,
determining a correspondence among the two or more generated digital fingerprints based, at least in part, on the identities of the two or more nodes; and
for each of the two or more generated digital fingerprints,
determining a pattern matching correlation between the generated digital fingerprint and the classifier digital fingerprints; and
determining a pattern matching correlation between the generated digital fingerprint and the other of the at least two generated digital fingerprints.

14. The apparatus of claim 13, wherein the two or more generated digital fingerprints are generated from transaction event entries that include serial transaction data associated with the two or more nodes, said program code comprising program code executable by the processor to cause the apparatus to:
comparatively process a series of the transaction event entries to determine an activity divergence event; and
in response to detecting an activity divergence event associated with a next transaction event entry, exclude a digital fingerprint generated for the next transaction event entry from the fault event set.

15. The apparatus of claim 14, further comprising program code executable by the processor to cause the apparatus to:
generate diagnostic digital fingerprints for each the one or more event classification sets; and
determine a causal property for the fault event set based on regression processing of the associated digital fingerprints with respect to the diagnostic digital fingerprints.

* * * * *